(12) United States Patent
Satpathy et al.

(10) Patent No.: US 9,915,012 B2
(45) Date of Patent: Mar. 13, 2018

(54) COMPACT POLYMERIC GEL AND FIBERS MADE THEREFROM

(71) Applicant: Reliance Industries Limited, Mumbai (IN)

(72) Inventors: Uma Sankar Satpathy, Vadodara (IN); Satya Srinivasa Rao Gandham, Vadodara (IN); Ajit Behari Mathur, Vadodara (IN); Raksh Vir Jasra, Vadodara (IN); Krishna Renganath Sarma, Vadodara (IN); Amit Kumar Punamchand Shah, Vadodara (IN); Yogini Maheshbhai Amin, Vadodara (IN); Gaurang Manilal Mehta, Vadodara (IN); Nanubhai Fuljibhai Patel, Vadodara (IN); Viralkumar Patel, Kheda (IN)

(73) Assignee: Reliance Industries Limited (IN)

(*) Notice: Subject to any disclaimer, the term of this patent is extended or adjusted under 35 U.S.C. 154(b) by 0 days.

(21) Appl. No.: 14/892,817

(22) PCT Filed: May 21, 2014

(86) PCT No.: PCT/IN2014/000345
§ 371 (c)(1),
(2) Date: Nov. 20, 2015

(87) PCT Pub. No.: WO2014/195963
PCT Pub. Date: Dec. 11, 2014

(65) Prior Publication Data
US 2016/0168758 A1    Jun. 16, 2016

(30) Foreign Application Priority Data

May 21, 2013 (IN) .......................... 1801/MUM/2013

(51) Int. Cl.
*C08J 3/075*  (2006.01)
*D01F 6/04*  (2006.01)
(Continued)

(52) U.S. Cl.
CPC ............ *D01F 6/04* (2013.01); *B29C 47/0004* (2013.01); *B29C 47/0014* (2013.01);
(Continued)

(58) Field of Classification Search
CPC .... C08F 110/02; C08F 2500/01; C08L 23/06; C08L 2205/24; C08L 2201/56;
(Continued)

(56) References Cited

U.S. PATENT DOCUMENTS 4,944,974 A    7/1990 Zachariades
5,342,567 A    8/1994 Chen et al.
(Continued)

FOREIGN PATENT DOCUMENTS

WO    WO 2008/141405    11/2008

OTHER PUBLICATIONS

International Search Report of the International Searching Authority dated Dec. 15, 2014, issued in connection with International Patent Appln. No. PCT/IN2014/000345 (3 pages).

*Primary Examiner* — Satya Sastri
(74) *Attorney, Agent, or Firm* — McCarter & English, LLP

(57) ABSTRACT

The present disclosure relates to a compact polymer gel consisting of ultrahigh molecular weight polyethylene (UHMWPE), at least one nucleator, at least one filler and at least one fluid medium. The present disclosure also provides a process for the preparation of the compact polymeric gel and fibers from the compact polymeric gel. The fibers prepared in accordance with the present process have tensile strength (Continued)

ranging from 2.5 to 10 GPa and tensile modulus ranging from 110 to 300 GPa.

11 Claims, 1 Drawing Sheet

(51) Int. Cl.
| | | |
|---|---|---|
| *D01F 1/10* | (2006.01) | |
| *B29C 47/00* | (2006.01) | |
| *B29C 47/08* | (2006.01) | |
| *C08K 13/06* | (2006.01) | |
| *B29K 23/00* | (2006.01) | |
| *B29L 31/00* | (2006.01) | |

(52) U.S. Cl.
CPC ........... *B29C 47/0896* (2013.01); *C08J 3/075* (2013.01); *C08K 13/06* (2013.01); *D01F 1/10* (2013.01); *B29K 2023/0683* (2013.01); *B29L 2031/731* (2013.01); *C08J 2323/06* (2013.01)

(58) Field of Classification Search
CPC ............ B29C 47/0004; B29C 47/0014; B29C 47/0896; B29K 2023/0683; C08J 2323/06; C08K 13/06; D01F 1/10; D01F 6/04

See application file for complete search history.

(56) References Cited

U.S. PATENT DOCUMENTS

| | | | |
|---|---|---|---|
| 5,602,197 A | 2/1997 | Johnson et al. | |
| 7,147,207 B2 | 12/2006 | Jordan et al. | |
| 7,147,807 B2 | 12/2006 | Kavesh | |
| 7,575,703 B2* | 8/2009 | Kristiansen | C08J 3/092 264/210.6 |
| 2007/0135541 A1* | 6/2007 | Chundury | C08K 9/04 524/128 |
| 2009/0117805 A1* | 5/2009 | Simmelink | D01F 1/10 442/392 |
| 2009/0123748 A1* | 5/2009 | da Silva | C08L 23/06 428/364 |
| 2009/0202853 A1* | 8/2009 | Magno | D01F 6/04 428/523 |
| 2011/0082262 A1* | 4/2011 | Yeh | B82Y 30/00 525/333.7 |

\* cited by examiner

COMPACT POLYMERIC GEL AND FIBERS
MADE THEREFROM

RELATED APPLICATIONS

This application is a U.S. National Phase Application under 35 U.S.C. 371 of International Application No. PCT/IN2014/000345 filed May 21, 2014, which claims the benefit of Indian Patent Application No. 1801/MUM/2013 filed on May 21, 2013. The disclosures of these applications are incorporated herein by reference in their entireties.

FIELD

The present disclosure relates to polymeric gels. Particularly, the present disclosure relates to compact polymeric gels and fibers made therefrom.

Definition

As used in the present disclosure, the following word/s and phrase/s are generally intended to have the meaning as set forth below, except to the extent that the context in which they are used to indicate otherwise.

The expression 'fiber' for the purpose of the present disclosure is a continuous elongated element, wherein the length dimension is much greater than the transverse dimensions of width and thickness. Accordingly, the expression fiber includes filament, ribbon, strip, yarn and the like having regular or irregular cross-section. The term 'compact' for the purpose of the present disclosure, is used to describe a polymeric gel of the present disclosure having properties that favor optimum morphology and rheology leading to ease of spinning.

The term 'disentangled' is used to describe ultrahigh molecular weight polyethylene-homo-polymer(s) or copolymer(s) of ethylene having molar mass in the range of 0.5 million to 20 million; crystallinity greater than 75%; heat of fusion greater than 200 J/g and bulk density ranging from 0.048 to 0.3 g/cc, wherein the polyethylene chains have low entanglement or are completely disentangled.

BACKGROUND

High strength, high modulus polyethylene fibers have been prepared from ultrahigh molecular weight polymers by solution spinning and drawing. Such filaments have proven extremely useful for cut-resistant applications, composites, ropes and netting. Conventionally, polymeric solutions have been subjected to spinning to obtain strong polyethylene fibers.

With the advancement of technology, two solution spinning processes were developed. In one solution spinning process, a solution of ultrahigh molecular weight polyethylene (UHMWPE) is prepared at an elevated temperature in a first solvent such as a heavy mineral oil that is essentially non-volatile at the spinning temperature. This polymer solution is spun and quenched to a gel state essentially without evaporation of the solvent. The solvent is removed from the gel filaments by extraction using another solvent having a boiling point lower than 100° C. The gel filaments containing the second solvent are dried to form xerogel filaments. Multi-stretching of gel filaments is carried out before the extraction of the first solvent, before evaporating the second solvent and after drying the filament.

According to a second solution spinning process, a solution of ultrahigh molecular weight polyethylene (UHMWPE) is prepared in a solvent that is volatile at the spinning temperature. The UHMWPE solution is spun at an elevated temperature, cooled to form gel filaments where the volatile solvent is evaporated and then the filaments are stretched. U.S. Pat. No. 7,147,807 discloses a process for spinning high molecular weight poly (alpha-olefin) (UHMWPO) filament from solution in a volatile solvent with recovery and recycling of the solvent. However, the UHMWPE filament obtained by the process disclosed in U.S. Pat. No. 7,147,207 suffers from drawbacks such as high crimp, high light transmittance, high creeping and low heat resistance.

US Patent Publication No. 20110082262 mentions a composite material prepared by mixing an inorganic substance and an UHMWPE gel solution and processing the solution by a predetermined manufacture process. However, excessive use of inorganic substance cracks or breaks the fibers at an early stage of the process.

Attempts have also been made to prepare high strength and stiffness fibers by orienting the polymer chains in a parallel fashion along the fiber-axis. However, in high performance polyethylene fibers (HP-PE) orientation/extension of the individual molecule is very difficult as these polymer chains are highly flexible and get entangled within themselves and with each other. Furthermore, UHMWPE fibers have a tendency to creep which makes them inefficient for utilization in long term applications.

In spite of the technological advancements, the conventional processes used for the preparation of fibers from UHMWPE are expensive and produce fibers that have poor morphological and mechanical properties. A need is therefore felt for providing a process for the preparation of fibers having excellent morphological and mechanical properties and a gel for the preparation of the fibers.

OBJECTS

Some of the objects of the present disclosure, of which at least one embodiment is adapted to provide, are described herein below:

It is an object of the present disclosure to provide a compact polymeric gel.

It is another object of the present disclosure to provide a compact polymeric gel having adequate shelf-life and spinability.

It is yet another object of the present disclosure to provide a process for preparing a compact polymeric gel.

It is still another object of the present disclosure to provide fibers prepared from compact polymeric gel.

It is yet another object of the present disclosure to provide fibers prepared from compact polymeric gel having adequate morphological and mechanical properties.

It is still another object of the present disclosure to ameliorate one or more problems of the prior art or to at least provide a useful alternative.

Other objects and advantages of the present disclosure will be more apparent from the following description and the accompanying drawings which is not intended to limit the scope of the present disclosure.

SUMMARY

The present disclosure provides a compact polymeric gel comprising:
 i. ultrahigh molecular weight polyethylene (UHMWPE) in an amount ranging from 2.0 to 25.0% with respect to the total mass of the gel;

ii. at least one nucleator in an amount ranging from 0.05 to 3.0% with respect to the total mass of the gel;

iii. at least one filler in an amount ranging from 0.025 to 1.0% with respect to the total mass of the gel; and iv. at least one fluid medium.

The present disclosure further provides a process for the preparation of the afore-stated compact polymeric gel and also a process for the preparation of fibers from the compact polymeric gel that is disclosed in the present disclosure. Typically, the fiber obtained from the present process is characterized by tensile strength ranging from 2.5 to 10 GPa and the tensile modulus ranging from 110 to 300 GPa.

BRIEF DESCRIPTION OF THE ACCOMPANYING DRAWINGS

The disclosure will now be explained in relation to the non-limiting accompanying drawings, in which:

FIG. 1 illustrates a process for producing UHMWPE fiber, wherein a represents nitrogen pressure;

b represents polymeric gel;

c represents a first heater;

d represents fiber drawing;

e represents a water bath for fiber washing;

f represents a solvent bath for fiber washing;

g represents the line to winder;

h represents a second heater; and

QB represents a quenching bath for chilled water.

DETAILED DESCRIPTION

Figure 1:
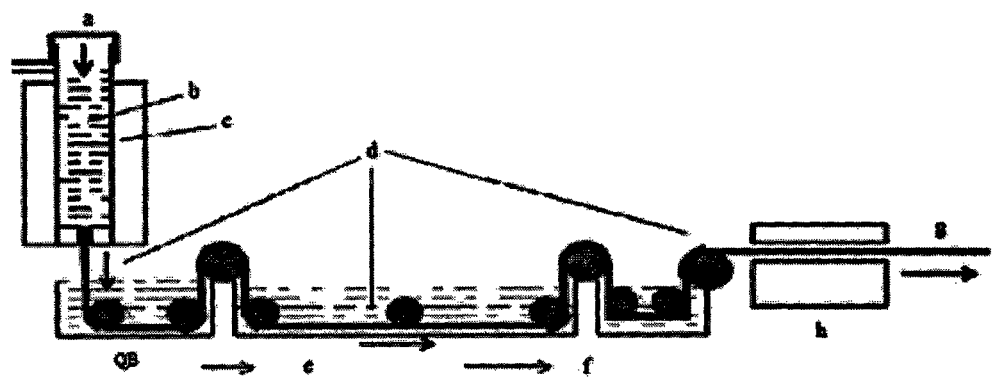

The inventors of the present disclosure envisage a process for producing fiber that offers advantage of both the gel spinning and the melt spinning processes. In gel spinning precisely heated gel of UHMWPE is extruded through a spinneret. The extrudate is drawn through the air and then cooled in a water bath. The end-result is a fiber with a high degree of molecular orientation, and therefore the end product shows exceptional tensile strength and tensile modulus. The process of gel spinning depends on isolating individual chain molecules in the solvent so that intermolecular entanglements are minimal. Entanglements make chain orientation more difficult and lower the strength of the final product.

In accordance with one aspect of the present disclosure, there is provided a compact polymeric gel that contains ultrahigh molecular weight polyethylene (UHMWPE), at least one nucleator, at least one filler and at least one fluid medium. The UHMWPE used in making the compact polymeric gel is present in an amount ranging from 2.0 to 25.0% with respect to the total mass of the gel. The polymer concentration in the gel is found to play a very important role. The UHMWPE, in one embodiment, is entangled UHMWPE. The UHMWPE used in the compact polymeric gel, in another embodiment, is a combination of entangled and disentangled UHMWPE such that the amount of dis-UHMWPE is less than the amount of entangled UHMWPE. Typically, the disentangled UHMWPE has molar mass ranging from 0.5 to 15 million. The use of disentangled ultrahigh molecular weight polyethylene (dis-UHMWPE) in the composition imparts high tenacity to the fiber.

At least one nucleator is present in an amount ranging from 0.05 to 3.0% with respect to the total mass of the gel and is selected from the group consisting of di(3,4-dimethylbenzylidene)sorbitol (Millad 3988), 2,2'-Methylene-bis-(4,6-di-tert-butylphenyl)phosphate Sodium salt (NA11) and aluminum hydroxy bis(2,2'-methylenebis[4,6-di(tert-butyl)phenyl]phosphate (NA21). The filler is included in an amount ranging from 0.025 to 1.0% with respect to the total mass of the gel and is at least one selected for the group consisting of montmorillonite modified with a quaternary ammonium salt (Closite 15A) and calcium stearate. Fillers are added to improve creep resistant properties and thermal stability of the resulting fiber. The improvement in creep properties may be due to strain hardening and crosslinking behavior, whereas thermal stability is attributed to the dispersion of filler platelet on to polymeric network showing nano composite characteristics. The fillers in combination with nucleators expedite the process of gelation and crystallization which ultimately facilitates the disentangling and compaction process effectively and efficiently leading to the formation of ultra-high strength and high modulus fibers.

The fluid medium used in the gel is present in an amount sufficient enough to impart gelly nature to the polymeric mixture and is at least one selected for the group consisting of aliphatic hydrocarbons, acyclic hydrocarbons, cyclic hydrocarbons, aromatics hydrocarbons and halogenated hydrocarbons. Though any fluid medium can be used a fluid medium having boiling point greater than 180° C. is particularly used. Typically, the fluid medium is at least one selected for the group consisting of cis-decahydronaphthalene, trans-decahydronaphthalene, decalin, mineral oil and dichlorobenzene.

The polymeric gel of the present disclosure further includes at least one antioxidant in an amount ranging from 0.25 to 5.0% with respect to the total mass of the gel. The antioxidant prevents thermal degradation of the gel during extrusion which is carried out at elevated temperature. Typically, the antioxidant is at least one selected for the group consisting of tris(2,4-ditert-butylphenyl)phosphite and pentaerythritol Tetrakis(3-(3,5-di-tert-butyl-4-hydroxyphenyl)propionate). In one embodiment a combination of two antioxidants is used wherein the ratio of first antioxidant to the second antioxidant ranges from 1:1 to 1:2. The polymeric gel may also contain at least one modifier in an amount ranging from 0.1 to 1.5% with respect to the total mass of the gel. In one embodiment, the modifier is calcium stearate. The modifier used in the polymeric gel contributes in improving the process by modifying the ability and mobility of the macromolecular chain of UHMWPE.

In accordance with another aspect of the present disclosure, there is provided a process for the preparation of the compact polymeric gel. The process initially includes admixing UHMWPE in an amount ranging from 2.0 to 25.0% with respect to the total mass of the gel, optionally, dis-ultrahigh molecular weight polyethylene (dis-UHMWPE) in an amount less than the amount of UHMWPE, at least one nucleator in an amount ranging from 0.05 to 3.0% with respect to the total mass of the gel, at least one filler in an amount ranging from 0.025 to 1.0% with respect to the total mass of the gel, optionally at least one antioxidant in an amount ranging from 0.25 to 5.0% with respect to the total mass of the gel and optionally, at least one modifier in an amount ranging from 0.1 to 1.5% with respect to the total mass of the gel to obtain a first admixture. Next, the first admixture is incorporated in the fluid medium to obtain a second admixture which is heated at a temperature ranging from 50 to 200° C. for a time period ranging from 2 to 20 hours under inert conditions to obtain a compact polymeric gel composition. The temperature-time protocol plays a crucial role in optimizing the rheological characteristics of the compact polymeric gel. Further, the dissolution time period may vary depending on the molecular weight of the polymer. Temperature-time distribution can be maintained either in single spell or in two spell for making the gel. The spells are decided based on the range of the molecular weight of the polymer being used for preparing the gel.

The composition is cooled to obtain a cooled polymeric gel composition; which after removing the excess of the fluid medium results in the compact polymeric gel. Then the mixture is cooled to attain a compact gel state having sufficient level of molecular dis-entanglement, making it suitable for fiber spinning. The excess fluid medium is removed from the gel to adjust the concentration of polymer in the gel. The removed excess fluid medium may further be recycled and reused in the same or different processes. This method step of filter press before spinning makes the process economic and safe. The compact polymeric gel obtained after removing fluid medium may be stored up to six months or may be used immediately for extrusion/fiber spinning.

In accordance with yet another aspect of the present disclosure, there is provided a process for the preparation of fibers from the compact polymeric gel of the present disclosure. Typically, the fibers have tensile strength ranging from 2.5 to 10 GPa and the tensile modulus ranging from 110 to 300 GPa.

The process is initiated by spinning the compact polymeric gel at a temperature ranging from 120 to 200° C., at a pressure ranging from 2 to 3 kg/cm$^2$ to obtain gel spun fibers. The step of spinning is carried out either by using a spinning unit or by a single screw extruder. The gel spun fibers are extruded at different temperature profiles such as 220° C.-230° C.-250° C., 205° C.-220° C.-240° C. or 195° C.-200° C.-200° C. to obtain uniform denier gel spun fibers. The compact gel is extruded on a single screw extruder to produce multi fiber tow under optimum temperature profile of 220° C.-230° C.-250° C. for making uniform denier gel spun fiber. In another embodiment the compact gel is extruded on a single screw extruder to produce multi fiber tow under optimum temperature profile of 205° C.-220° C.-240° C. for making uniform denier gel spun fiber. In still another embodiment the compact gel is extruded on a single screw extruder to produce multi fiber tow under optimum temperature profile of 195° C.-200° C.-200° C. for making uniform denier gel spun fiber. The rate of extrusion of fibers is optimized depending on the number of fibers required for further process.

The uniform denier gel spun fibers are then quenched in at least one quenching solvent at a temperature ranging from 5° C. to 30° C. to obtain quenched gel spun fibers. This temperature range was found to be very sensitive to regulate amorphosity and crystallinity of fiber so that the kind of microstructure produced in turn produces ultra-high tenacity upon multistage hot stretching. The quenching solvent of the present disclosure, in one embodiment, is water. The quenched fibers are further washed with water or acetone or hexane. In an exemplary embodiment, the gel fiber is passed through a water bath kept at a temperature of 25° C. to remove the solvent and then passed through an acetone bath primarily to remove maximum amount of solvent from the fiber.

The quenched gel spun fibers are then dried at a temperature ranging from 80° C. to 125° C. to obtain dried gel spun fibers following which they are hot stretched at a temperature ranging from 90° C. to 140° C. at a draw ratio of 5 to 100 to obtain the fibers of the present disclosure. In one embodiment, the step of hot stretching is multi-stage hot stretching.

In one embodiment of the present disclosure, the fiber after extrusion is allowed to undergo aerial stretching by adjusting the distance between the spinnerets and the quench bath so that such pre-stretched filaments when quenched evenly, distribute the amorphosity and crystallinity of the gel fiber.

In accordance with the present disclosure the use of compact gel provides effective control over morphology and microstructure of gel spun fiber through spinning which essentially facilitates to minimize fiber defects as well as solvent retention to a greater extent. More importantly, when such gel spun fiber of the present disclosure is subjected to hot stretching it promotes ultra-drawing to produce ultra-high tenacity and ultra-high modulus fibers even at lower overall total draw ratio. In one embodiment of the present disclosure high tensile strength and tensile modulus properties are achieved at a very lower draw ratio, typically below 20.

It is significant to note that the gelation mechanisms of UHMWPE chain differ significantly in decalin and paraffin although these are the typical solvents used to gel spin UHMWPE fibers with high strengths and moduli. In both the solvents, gelation is attributed to liquid-liquid phase separation driven by concentration fluctuations during the initial stage. The gelation speeds and temperatures differ significantly in the two solvents. Particularly, in decalin, the solvent flows from the gels and syneresis occurs during crystallization; thereby making it easier to adjust the polymer concentration at higher side by removing the solvent prior to spinning. Moreover, the gelation of UHMWPE in decalin is generated in the polymer-rich phase (the heterogeneous network system) during the phase separation and the phase separation plays a driving force to cause gelation/crystallization under an optimum temperature and time during the dissolution process of the polymer. Also, in the current process, presence of optimum doses of nucleator and filler further promotes the cooperative events of gelation and crystallization of the polymeric chain which eventually governs the aggregation/compaction of the macromolecular disentangled chains under heating and cooling process through optimum temperature and time management finally to obtain the compact gel at an ambient temperature. Gel syneresis plays an important role of removing decalin from the gels and of facilitating control over the morphology and rheology of the spinable gel.

In yet another aspect of the present disclosure the fibers obtained in accordance with the present disclosure are useful in cut-resistant, composites, ropes and netting applications.

The present disclosure will now be discussed in the light of the following non-limiting embodiments:

Example 1: Process for the Preparation of Fibers According to the Present Disclosure A] A compact gel of UHMWPE having molecular weight of 3.2 million was premixed with 0.2% of Pentaerythritol Tetrakis(3-(3,5-di-tert-butyl-4-hydroxyphenyl)propionate), 0.40% of Tris(2,4-ditert-butylphenyl)phosphite, 0.25% of Di(3,4-dimethylbenzylidene)sorbitol (Millad 3988), 0.025% of montmorillonite modified with a quaternary ammonium salt (Closite 15A) and 0.1% of Calcium stearate in the presence of Decaline to obtain a mixture. The mixture was set at a concentration of 7 wt % using one lit reactor under nitrogen where the temperature was critically maintained at two stages 90° C. and 170° C. under stirring at a speed of 40 to 60 rpm for a total time period of 4 hrs. The compact gel was then extruded at 175° C. through a spinneret of diameter 0.5 mm into a water bath having a temperature of 5 to 10° C. After cooling in the water bath, the resultant gelatinous filament was passed through wash bath followed by acetone bath at 25° C. and subsequently dried on line. The dried fibers were winded. The monofilament with uniform denier was finally collected on a spool and was subsequently subjected to two-step hot stretching at 95° C. and 140° C. to obtain the fiber.

The gel spun filament comprised a physical network of polyethylene chains and was found to be sufficiently strong to be transported to an oven for drawing and solvent removal. Also, the compact gel that was prepared contained optimum levels of nucleator and montmorillonite modified with a quaternary ammonium salt (Closite15A) which facilitated the disentangling process effectively and efficiently and the gel when spun into a filament produced an optimum microstructure.

B] A compact gel of UHMWPE having molecular weight of 5.2 million was premixed with 0.2% Pentaerythritol Tetrakis(3-(3,5-di-tert-butyl-4-hydroxyphenyl)propionate), 0.40% of Tris(2,4-ditert-butylphenyl)phosphite, 0.25% of Di(3,4-dimethylbenzylidene)sorbitol (Millad 3988), 0.025% of montmorillonite modified with a quaternary ammonium salt (Closite 15A) and 0.1% of Calcium stearate in the presence of Decaline to obtain a mixture. The mixture was set at a concentration of 7 wt % using one lit reactor under nitrogen where the temperature was critically maintained at two stages 90° C. and 170° C. under stirring at a speed of 40 to 60 rpm for a total time period of 4 hrs. Next, the compact gel was extruded at 175° C. through a spinneret of diameter 0.5 mm into a water bath having a temperature ranging from 5 to 10° C. After cooling in the water bath, the resultant gelatinous filament was passed through a water wash bath followed by acetone bath at 25° C. and subsequently dried on line at 100° C. The dried fibers were winded. The monofilament with uniform denier: was finally collected on a spool and was subsequently subjected to two-step hot stretching at 95° C. and 140° C. to obtain the fiber.

The gel spun filament comprised a physical network of polyethylene chains and was found to be sufficiently strong to be transported to an oven for drawing and solvent removal. Also, the compact gel that was prepared contained optimum levels of nucleator and montmorillonite modified with a quaternary ammonium salt (Closite15A) which facilitated the disentangling process effectively and efficiently and the gel when spun into a filament, produced an optimum microstructure.

The properties of the filament/fiber obtained in Example 1A and 1B are summarized in Table-1.

TABLE 1

Properties of filaments of Example 1A and 1B

|  | Tensile Modulus (GPa) | Tensile strength (GPa) | Poly MW | Total draw ratio (TDR) |
| --- | --- | --- | --- | --- |
| Spin-1 | 130 | 5.89 | 3.2M | 15 |
| Spin-2 | 117 | 4.63 | 5.2M | 15 |

TABLE 1-continued

Properties of filaments of Example 1A and 1B

|  | Tensile Modulus (GPa) | Tensile strength (GPa) | Poly MW | Total draw ratio (TDR) |
| --- | --- | --- | --- | --- |
| Spin-3 | 239 | 8.52 | 5.2M | 22 |
| Spin-4 | 298 | 10.93 | 5.2M | 28 |

Example 2: Process Conducted by Using Different Polymer Concentrations

A compact gel of UHMWPE having MW of 3.2 million was prepared under different concentrations and extruded at 175° C. as described in Example 1. However, 0.2% of Pentaerythritol Tetrakis(3-(3,5-di-tert-butyl-4-hydroxyphenyl)propionate), 0.30% of Tris(2,4-ditert-butylphenyl)phosphite, 0.025% of Millad, 0.025% of montmorillonite modified with a quaternary ammonium salt (Closite15A) and 0.1% of Calcium stearate were used in the present example. In this example the effect of polymer concentration was evaluated. The gel spun fiber produced under different polymer concentrations was dried at 100° C. and subjected to two step hot stretching at 90° C. and 125° C. The mechanical properties of the hot stretched fiber were evaluated by UTM as per ASTM standards on a tensile mode maintaining TDR of 18 respectively. The results obtained were summarized in Table-2

TABLE 2

Spinning Conditions and Filament properties

| Expt. No. | Poly conc. (wt %) | Bath Temp. ° C. | Wash Bath Temp. ° C. | Winding speed Mt/mint. | TS (GPa) | TM (GPa) |
| --- | --- | --- | --- | --- | --- | --- |
| Spin-5 | 3 | 5 | 25 | 9 | 1.5 | 80 |
| Spin-6 | 5 | 5 | 25 | 9 | 1.7 | 101 |
| Spin-7 | 7 | 5 | 25 | 9 | 2.75 | 120 |

Example 3: Effect of Ageing

The gel obtained in Example 2 was kept for one month, two months and five months separately at 25° C. and then was extruded under the same conditions as described in Example 2. The gel was spun into fibers under similar conditions as described in Example 2 and the hot stretched fiber showed mechanical properties as presented in Table 3. From the results, it can be concluded that aged gel retains its spinability characteristics and the fiber properties even after storage.

TABLE 3

Effect of ageing time on filament properties

| Expt. No. | Ageing time(Month) | TS (GPa) | TM (GPa) |
| --- | --- | --- | --- |
| Spin-8 | 01 | 2.75 | 118 |
| Spin-9 | 02 | 2.98 | 120 |
| Spin-10 | 05 | 3.12 | 122 |

Example 4: Effect of Dis-UHMWPE

Two compact gel blends of entangled UHMWPE (3.2 M) and Dis-UHMWPE (3.5 M) in the ratio 80/20 wt % including the afore-stated anti-oxidant, nucleator and fillers, were prepared as mentioned in Example 1. The two blends were set at a concentration of 5% and 7% separately and extruded at 175° C. as described in Example 1. The spinning conditions were almost the same as in Example 1. The hot stretching conditions were same as in Example 2. It was found that the presence of dis-UHMWPE influenced the spinability efficiency as well as the final microstructure of the gel spun fiber. Mechanical properties of the filaments obtained are summarized in Table 4.

TABLE 4

Effect of Dis-UHMWPE on the mechanical properties of the filament

| Expt. No. | Poly Conc. wt % | TS (GPa) | TM (GPa) |
|---|---|---|---|
| Spin-11 | 5 | 2.45 | 119 |
| Spin-12 | 7 | 3.25 | 125 |

Example 5

A compact gel of UHMWPE having MW of 5.2 M was prepared under different nucleator concentrations using 0.1% Closite-15A, as per the procedure described in Example 1. The concentration was set at 7% by adjusting the solvent concentration in the compact gel. The antioxidant and Calcium stearate concentrations were same as in Example 1. The gel was extruded at 175° C. and the gel spun fibers were finally hot stretched under two different temperatures of 110° C. and 145° C. having total draw ratio 17. Fiber properties are summarized in Table 5.

TABLE 5

UHMWPE fiber properties after hot stretching

| Expt. No. | Ageing time (hrs) | Di(3,4-dimethylbenzylidene)sorbitol (Millad 3988) (wt %) | TS (GPa) | TM (GPa) | Elongation (%) | TDR |
|---|---|---|---|---|---|---|
| Spin-13 | 24 | 0.025 | 2.54 | 115 | 5.12 | 17 |
| Spin-14 | 24 | 0.2 | 3.51 | 135 | 3.24 | 17 |
| SPIN-15 | 24 | 0.5 | 5.43 | 215 | 2.75 | 17 |

Example 6

A compact gel of UHMWPE (MW 10 million) containing 3% polymeric concentration was prepared as per Example 1 and Example 5 (i.e. Spin-15). The gel was spun into a fiber and subsequently the gel spun fiber was hot stretched directly at 145° C. with total draw ratio of 10. The hot stretched fiber showed the following mechanical properties as described in Table 6.

TABLE 6

Mechanical properties of the hot stretched UHMWPE fiber

| Expt. No. | MW | Poly conc. (wt %) | Millad (wt %) | TS (GPa) | TM (GPa) | Elongation (%) |
|---|---|---|---|---|---|---|
| Spin-16 | 10M | 3.0 | 0.5 | 2.75 | 165 | 2.18 |

Example 7

Figure 2:
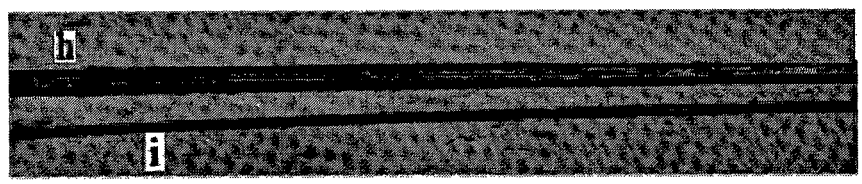
FIG. 2 illustrates a variation in the diameter/denier of a fiber before and after hot stretching, wherein 'h' is the diameter of the fiber before hot stretching; and 'i' is the diameter of the fiber after hot stretching.
Figure 3:
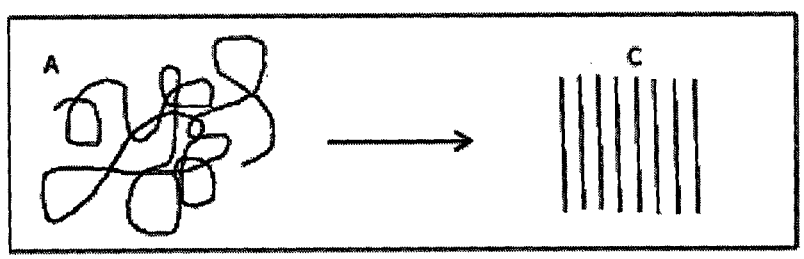
FIG. 3 illustrates the phenomenon of stretching of the fiber for attaining high molecular orientation, wherein 'C' indicates oriented crystalline fibers produced from random coils of fibers; and 'A' indicates the fibers prepared by using the drawing process of the present disclosure.

A compact gel was prepared as per Example 1 and Example 5 (i.e. Spin-14) from UHMWPE (MW 3.2 million) at the concentration of 8% by adjusting the solvent level in the gel. The gel was aged for 120 hours and then spun into a fiber. The prepared gel spun fiber was subjected to multi step hot stretching at temperatures of 115° C. and 145° C. with total draw ration of 14. The fiber diameter was measured by Polaroid optical microscope as shown in FIG. 2. The morphological characteristics showed a fine denier of fiber and better degree of orientation as reflected in mechanical properties. The results are summarized in Table 7.

TABLE 7

Mechanical properties of hot stretched gel spun UHMWPE fiber

| Expt. No. | MW | Poly conc. (wt %) | Millad 3988 (wt %) | TS (GPa) | TM (GPa) | Elongation (%) |
|---|---|---|---|---|---|---|
| Spin-17 | 3.2M | 8.0 | 0.25 | 4.25 | 185 | 3.35 |

Example 8

A compact gel of UHMWPE (MW 5.2 million) was prepared as mentioned in Example 1 and Example 5 (i.e. Spin-14) at a set concentration of 7% by adjusting the solvent level in the gel. The gel was aged for 120 hours and was spun into a fiber on a single screw extruder under the temperature profile of 190-195-200° C. at 10-15 rpm. Continuous length fiber greater than 1000 mts was produced on the extruder with uniform denier. The prepared gel spun fiber was subjected to multi step hot stretching at temperatures of 115° C. and 145° C. with total draw ration of 14. Single filament and multi filament tow was prepared using 0.5 mm diameter spinnerets. Fiber properties are summarized in Table 8.

TABLE 8

Process conditions and properties of UHMWPE mono and multifilament

| Expt. No. | MW | Poly conc. (wt %) | Winding speed mt/mint | TS (GPa) | TM (GPa) | Fiber length (mt) |
|---|---|---|---|---|---|---|
| Spin-18 | 5.2M | 7.0 | 25 | 2.75 | 175 | >1000 |
| Spin-19 | 5.2M | 7.0 | 25 | 2.65 | 165 | >1000 |

Spin-18: Single filament,
Spin-19: Four filaments tow

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

TECHNICAL ADVANTAGES AND ECONOMIC SIGNIFICANCE

Due to the spinable compact gel, large amounts of the solvent (>90%) coming out from the extruder during direct feeding of the polymer slurry, as a routine practice for conventional gel spinning process, can avoided, making the present process more safe, easy and economical in recycling/recovering solvent.

Minimization of the residual solvent on to the core structure of fiber due to the improved morphology and microstructure prompts the production of ultra-high strength and high modulus fiber.

Superior mechanical properties are achieved at lower total draw ratio (>20 DR) as compared to the known processes (>50 DR).

The process of the present disclosure is favorable for high speed spinning.

The process of the present disclosure provides refined microstructure and morphology to produce defect free fine denier fibers having superior mechanical properties and high degree orientation. Further, high degree orientation is achieved at lower draw ratio.

The process of the present disclosure provides a gel that retains its spinability characteristics for a longer time period i.e., up to six months.

The fibers of the present disclosure have low creeping and low crimp properties.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

While certain embodiments of the inventions have been described, these embodiments have been presented by way of example only, and are not intended to limit the scope of the inventions. Variations or modifications in the process or compound or formulation or combination of this invention, within the scope of the invention, may occur to those skilled in the art upon reviewing the disclosure herein. Such variations or modifications are well within the spirit of this invention. The accompanying claims and their equivalents are intended to cover such forms or modifications as would fall within the scope and spirit of the invention.

The invention claimed is:

1. A compact polymeric gel comprising:
   i. ultrahigh molecular weight polyethylene (UHMWPE) in an amount ranging from 2.0 to 25.0% with respect to the total mass of the gel;
   ii. at least one nucleator in an amount ranging from 0.05 to 3.0% with respect to the total mass of the gel;
   iii. montmorillonite modified with a quaternary ammonium salt as filler, in an amount ranging from 0.025 to 1.0% with respect to the total mass of the gel; and
   iv. at least one fluid medium,
   said gel characterized in that the UHMWPE is selected from the group consisting of entangled UHMWPE and a combination of entangled UHMWPE with disentangled UHMWPE (dis-UHMWPE), wherein the amount of dis-UHMWPE is less than the amount of entangled UHMWPE.

2. The polymeric gel as claimed in claim 1, further includes at least one antioxidant in an amount ranging from 0.25 to 5.0% with respect to the total mass of the gel.

3. The polymeric gel as claimed in claim 2, wherein said antioxidant is at least one selected from the group consisting of tris(2,4-ditert-butylphenyl)phosphite and pentaerythritol Tetrakis(3-(3,5-di-tert-butyl-4-hydroxyphenyl)propionate) and when two antioxidants are used, the ratio of a first antioxidant to a second antioxidant ranges between 1:1 and 1:2.

4. The polymeric gel as claimed in claim 1, further includes at least one modifier in an amount ranging from 0.1 to 1.5% with respect to the total mass of the gel.

5. The polymeric gel as claimed in claim 4, wherein said modifier is calcium stearate.

6. The polymeric gel as claimed in claim 1, wherein the weight average molar mass of the dis-UHMWPE ranges from 0.5 million to 15 million.

7. The polymeric gel as claimed in claim 1, wherein said nucleator is at least one selected from the group consisting of di(3,4-dimethylbenzylidene)sorbitol, 2,2'-Methylene-bis-(4,6-di-tert-butylphenyl)phosphate Sodium salt (NA11) and aluminum hydroxy bis(2,2'-methylenebis[4,6-di(tert-butyl)phenyl]phosphate (NA21).

8. The polymeric gel as claimed in claim 1, wherein said fluid medium is at least one selected from the group consisting of aliphatic hydrocarbons, acyclic hydrocarbons, cyclic hydrocarbons, aromatics hydrocarbons and halogenated hydrocarbons.

9. The polymeric gel as claimed in claim 1, wherein said fluid medium is at least one selected from the group consisting of cis-decahydronaphthalene, trans-decahydronaphthalene, decalin, mineral oil and dichlorobenzene.

10. A process for the preparation of a compact polymeric gel as claimed in claim 1, said process comprising the following steps:
   i. admixing UHMWPE in an amount ranging from 2.0 to 25.0% with respect to the total mass of the gel, at least one nucleator in an amount ranging from 0.05 to 3.0% with respect to the total mass of the gel, montmorillonite modified with a quaternary ammonium salt as filler in an amount ranging from 0.025 to 1.0% with respect to the total mass of the gel, optionally at least one antioxidant in an amount ranging from 0.25 to 5.0% with respect to the total mass of the gel and optionally, at least one modifier in an amount ranging from 0.1 to 1.5% with respect to the total mass of the gel to obtain a first admixture, wherein the UHMWPE is selected from the group consisting of entangled UHMWPE and a combination of entangled UHMWPE with disentangled UHMWPE (dis-UHMWPE) and the amount of dis-UHMWPE is less than the amount of entangled UHMWPE;

ii. incorporating said first admixture into at least one fluid medium to obtain a second admixture;

iii. heating said second admixture at a temperature ranging from 50 to 200° C. for a time period ranging from 2 to 20 hours under inert conditions to obtain a compact polymeric gel composition;

iv. cooling said polymeric gel composition to obtain a cooled polymeric gel composition; and v. removing the excess fluid medium from the polymeric gel composition to obtain the compact polymeric gel.

11. The process as claimed in claim 10, further includes a step of recycling the removed excess fluid medium.

* * * * *